United States Patent
Choi et al.

(10) Patent No.: US 12,441,836 B2
(45) Date of Patent: *Oct. 14, 2025

(54) POLYCARBONATE RESIN AND PREPARATION METHOD THEREOF

(71) Applicant: LG Chem, Ltd., Seoul (KR)

(72) Inventors: Il Hwan Choi, Daejeon (KR); Kyeongmun Kim, Daejeon (KR); Hye Jin Yim, Daejeon (KR); Jaesoon Bae, Daejeon (KR); Jonghwa Baek, Daejeon (KR); Hyeonah Shin, Daejeon (KR); Min Suk Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/035,572

(22) PCT Filed: Aug. 12, 2022

(86) PCT No.: PCT/KR2022/012136
§ 371 (c)(1),
(2) Date: May 5, 2023

(87) PCT Pub. No.: WO2023/182589
PCT Pub. Date: Sep. 28, 2023

(65) Prior Publication Data
US 2024/0384028 A1 Nov. 21, 2024

(30) Foreign Application Priority Data
Mar. 23, 2022 (KR) .................... 10-2022-0035981

(51) Int. Cl.
*C08G 64/16* (2006.01)
*C08G 64/30* (2006.01)
(52) U.S. Cl.
CPC ....... *C08G 64/1691* (2013.01); *C08G 64/307* (2013.01)
(58) Field of Classification Search
None
See application file for complete search history.

(56) References Cited
U.S. PATENT DOCUMENTS 7,115,700 B2 * 10/2006 Cella .................. C08G 64/04
528/196
2017/0275534 A1 9/2017 Reddy et al.
(Continued)

FOREIGN PATENT DOCUMENTS

EP 4239007 A1 9/2023
EP 4239008 A1 9/2023
(Continued)

OTHER PUBLICATIONS

English translation of JP-2015131918-A (Year: 2015).*
(Continued)

*Primary Examiner* — Randy P Gulakowski
*Assistant Examiner* — Audra J Destefano
(74) *Attorney, Agent, or Firm* — Lerner David LLP

(57) ABSTRACT

A polycarbonate resin including a unit of Chemical Formula 1 and a unit of Chemical Formula 2, a method for preparing the same, a polycarbonate resin composition including the same, and a molded article are disclosed herein:

[Chemical Formula 1]

[Chemical Formula 2]

(Continued)

Ar1 and Ar2 are independently an aryl group, or a heteroaryl group, R1 is hydrogen, deuterium, a halogen group, a cyano group, an alkyl group, a cycloalkyl group, an alkoxy group, a silyl group, an aryl group, or a heteroaryl group, R2 and R3 are different from each other, r1 is 1 or 2, r2 and r3 are each an integer from 1 to 4, L1 and L2 are independently an arylene group, X1 to X8 are independently O or S, Z1 to Z4 are independently an alkylene group, or a cycloalkylene group, and a, b, c and d are independently an integer from 1 to 10.

13 Claims, 1 Drawing Sheet

(56) References Cited

U.S. PATENT DOCUMENTS

| | | |
|---|---|---|
| 2019/0241703 A1 | 8/2019 | Kato et al. |
| 2023/0303767 A1 | 9/2023 | Jung et al. |

FOREIGN PATENT DOCUMENTS

| | | |
|---|---|---|
| EP | 4276135 A1 | 11/2023 |
| JP | 2013001868 A | 1/2013 |
| JP | 2015131918 A | 7/2015 |
| JP | 2017179323 A | 10/2017 |
| JP | 2018502820 A | 2/2018 |
| JP | 2020083813 A | 6/2020 |
| JP | 202237011 A | 3/2022 |
| JP | 2023537580 A | 9/2023 |
| JP | 2023551233 A | 12/2023 |
| JP | 2023552125 A | 12/2023 |
| JP | 2024514993 A | 4/2024 |
| KR | 20190025909 A | 3/2019 |
| KR | 20190032345 A | 3/2019 |

OTHER PUBLICATIONS

International Search Report for PCT/KR2022/012136 mailed Dec. 15, 2022. 3 pages. (See pp. 2-3, categorizing the cited references).

* cited by examiner

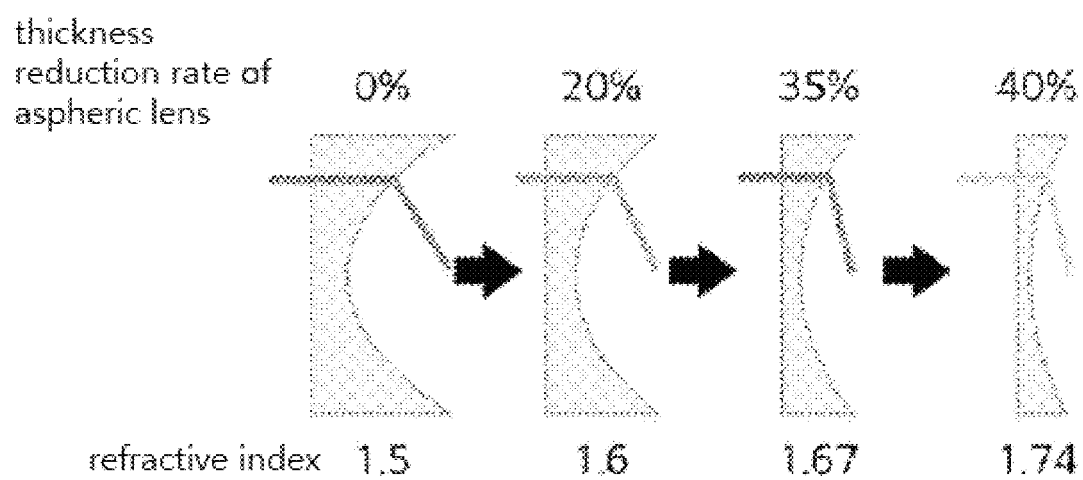

POLYCARBONATE RESIN AND PREPARATION METHOD THEREOF

CROSS-REFERENCE TO RELATED APPLICATIONS

This application is a national phase entry under 35 U.S.C. § 371 of International Application No. PCT/KR2022/012136, filed on Aug. 12, 2022, which claims priority from Korean Patent Application No. 10-2022-0035981, filed on Mar. 23, 2022, all the disclosures of which are incorporated by reference herein.

TECHNICAL FIELD

The present disclosure relates to a polycarbonate resin and a preparation method thereof.

BACKGROUND ART

The higher the refractive index of an optical material, the thinner the optical lens required to achieve the same level of correction. Accordingly, as the refractive index of the optical material is increased, a thinner and lighter lens can be manufactured, so that it is possible to make various devices, where lenses are used, smaller.

Generally, when the refractive index of an optical material is increased, there is a problem in that the Abbe's Number becomes low, and for use as an optical material, a certain level or higher of transparency is required.

DETAILED DESCRIPTION OF THE INVENTION

Technical Problem

An exemplary embodiment of the present disclosure has been made in an effort to provide a polycarbonate resin having a novel structure and a preparation method thereof.

Another exemplary embodiment of the present disclosure has been made in an effort to provide a polycarbonate resin composition including a polycarbonate resin having a novel structure and a molded article prepared from the polycarbonate resin composition.

Technical Solution

An exemplary embodiment of the present disclosure provides a polycarbonate resin including a unit of the following Chemical Formula 1 and a unit of the following Chemical Formula 2.

[Chemical Formula 1]

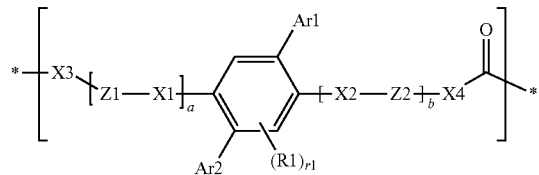

[Chemical Formula 2]

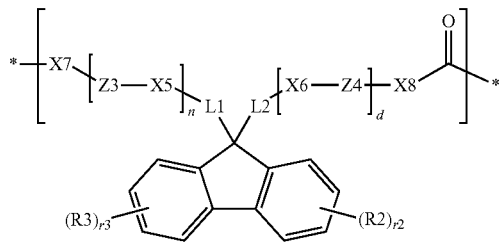

In Chemical Formulae 1 and 2,

Ar1 and Ar2 are the same as or different from each other, and are each independently a substituted or unsubstituted aryl group; or a substituted or unsubstituted heteroaryl group, R1 is hydrogen; deuterium; a halogen group; a cyano group; a substituted or unsubstituted alkyl group; a substituted or unsubstituted cycloalkyl group; a substituted or unsubstituted alkoxy group; a substituted or unsubstituted silyl group; a substituted or unsubstituted aryl group; or a substituted or unsubstituted heteroaryl group, R2 and R3 are different from each other, and are each independently hydrogen; deuterium; a halogen group; a cyano group; a substituted or unsubstituted alkyl group; a substituted or unsubstituted cycloalkyl group; a substituted or unsubstituted alkoxy group; a substituted or unsubstituted silyl group; an aryl group which is unsubstituted or substituted with deuterium, a halogen group, a hydroxyl group, a cyano group, an alkyl group, a cycloalkyl group, an alkoxy group, an alkenyl group, an aryloxy group, an arylthio group, an alkylthio group, an aryl group, or a heteroaryl group; or a substituted or unsubstituted heteroaryl group, r1 is 1 or 2, and when r1 is 2, two R1's are the same as or different from each other, r2 and r3 are each an integer from 1 to 4, and when r2 is 2 or higher, two or more R2's are the same as or different from each other, and when r3 is 2 or higher, two or more R3's are the same as or different from each other, L1 and L2 are the same as or different from each other, and are each independently a substituted or unsubstituted arylene group, X1 to X8 are the same as or different from each other, and are each independently O; or S, Z1 to Z4 are the same as or different from each other, and are each independently a substituted or unsubstituted alkylene group; or a substituted or unsubstituted cycloalkylene group, a, b, c and d are the same as or different from each other, and are each independently an integer from 1 to 10, and when a and b are each 2 or higher, structures in each parenthesis are the same as or different from each other, and

* means a moiety linked to the main chain of the resin.

An exemplary embodiment of the present invention provides a method for preparing a polycarbonate resin, the method including: polymerizing a composition for preparing the polycarbonate resin, which includes a compound represented by the following Chemical Formula 1a; a compound represented by the following Chemical Formula 2a; and a polycarbonate precursor.

[Chemical Formula 1a]

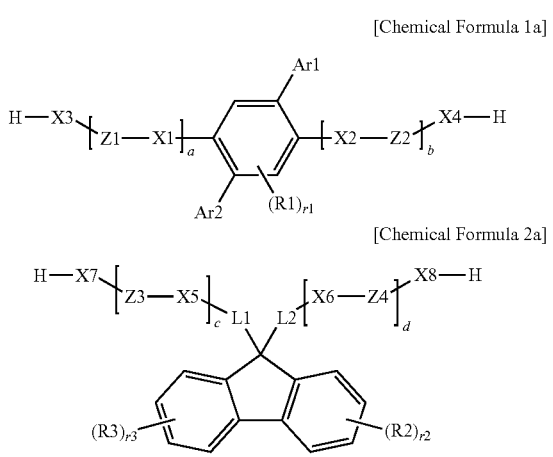

[Chemical Formula 2a]

In Chemical Formulae 1a and 2a,

Ar1 and Ar2 are the same as or different from each other, and are each independently a substituted or unsubstituted aryl group; or a substituted or unsubstituted heteroaryl group, R1 is hydrogen; deuterium; a halogen group; a cyano group; a substituted or unsubstituted alkyl group; a substituted or unsubstituted cycloalkyl group; a substituted or unsubstituted alkoxy group; a substituted or unsubstituted silyl group; a substituted or unsubstituted aryl group; or a substituted or unsubstituted heteroaryl group, R2 and R3 are different from each other, and are each independently hydrogen; deuterium; a halogen group; a cyano group; a substituted or unsubstituted alkyl group; a substituted or unsubstituted cycloalkyl group; a substituted or unsubstituted alkoxy group; a substituted or unsubstituted silyl group; an aryl group which is unsubstituted or substituted with deuterium, a halogen group, a hydroxyl group, a cyano group, an alkyl group, a cycloalkyl group, an alkoxy group, an alkenyl group, an aryloxy group, an arylthio group, an alkylthio group, an aryl group, or a heteroaryl group; or a substituted or unsubstituted heteroaryl group, r1 is 1 or 2, and when r1 is 2, two R1's are the same as or different from each other, r2 and r3 are each an integer from 1 to 4, and when r2 is 2 or higher, two or more R2's are the same as or different from each other, and when r3 is 2 or higher, two or more R3's are the same as or different from each other, L1 and L2 are the same as or different from each other, and are each independently a substituted or unsubstituted arylene group, X1 to X8 are the same as or different from each other, and are each independently O; or S.

Z1 to Z4 are the same as or different from each other, and are each independently a substituted or unsubstituted alkylene group; or a substituted or unsubstituted cycloalkylene group, and a, b, c and d are the same as or different from each other, and are each independently an integer from 1 to 10, and when a and b are each 2 or higher, structures in each parenthesis are the same as or different from each other.

Another exemplary embodiment of the present disclosure provides a polycarbonate resin composition including the polycarbonate resin according to the above-described exemplary embodiment.

Still another exemplary embodiment of the present disclosure provides a molded article including the polycarbonate resin composition according to the above-described exemplary embodiment.

Advantageous Effects

The polycarbonate resin according to the exemplary embodiments of the present disclosure has a high refractive index and high transparency.

By using the polycarbonate resin according to the exemplary embodiments of the present disclosure, an excellent optical lens, optical film, optical thin film, or optical resin having a small thickness can be obtained.

BRIEF DESCRIPTION OF DRAWINGS

The FIGURE is a view illustrating the reduction rate of lens thickness depending on the difference in refractive index.

BEST MODE

Hereinafter, the present disclosure will be described in more detail.

From the relationship form between the molecular structure and the refractive index, which is known by the Lorentz-Lorenz's formula, it can be seen that the refractive index of a material composed of molecules is increased by increasing the electron density of the molecule and reducing the molecular volume.

The resin including the unit of Chemical Formula 1 has a small molecular volume and is excellent in the ability to pack, and thus may improve the refractive index of the resin because the core structure of Chemical Formula 1 is a phenylene group. Further, when Ar1 and Ar2 are a substituent rich in electrons such as a substituted or unsubstituted aryl group; or a substituted or unsubstituted heteroaryl group, the refractive index of the resin may be further improved by increasing the electron density of the structure represented by Chemical Formula 1.

Since the substituents of the benzene rings on both sides of the fluorene structure of Chemical Formula 2 form an asymmetric structure and R2 and R3 are included as substituents, the refractive index of a molded article including the polycarbonate resin may be improved by increasing the electron density.

That is, the resin according to the present disclosure includes the unit of Chemical Formula 1 and the unit of Chemical Formula 2 to improve the reactivity, so that the resin is easily prepared, and the electron density of each core structure may be increased to improve the refractive index of the resin. Therefore, the polycarbonate resin according to an exemplary embodiment of the present disclosure has a high refractive index and high transparency, and an optical lens, an optical film, or an optical resin using the polycarbonate resin has a small thickness and may exhibit excellent optical characteristics.

Throughout the disclosure, the term "combination thereof" included in the Markush type expression means a mixture or combination of one or more selected from the group consisting of constituent elements described in the Markush type expression, and means including one or more selected from the group consisting of the above-described constituent elements.

Examples of the substituents in the present disclosure will be described below, but are not limited thereto.

In the present disclosure,

means a moiety to be linked.

In the present disclosure, the term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present disclosure, the term "substituted or unsubstituted" means being substituted with one or more substituents selected from the group consisting of deuterium; a halogen group; a hydroxyl group; a cyano group; an alkyl group; a cycloalkyl group; an alkoxy group; an alkenyl group; an aryloxy group; an arylthio group; alkylthio group; a silyl group; an aryl group; a condensed ring group of an aromatic hydrocarbon ring and an aliphatic hydrocarbon ring; and a heteroaryl group, being substituted with a substituent to which two or more substituents among the exemplified substituents are linked, or having no substituent.

In the present disclosure, the fact that two or more substituents are linked indicates that hydrogen of any one substituent is linked to another substituent. For example, when two substituents are linked to each other, a phenyl group and a naphthyl group may be linked to each other to become a substituent of

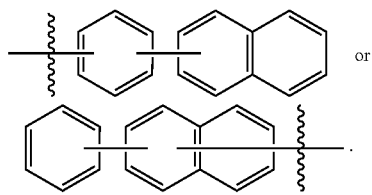

Further, the case where three substituents are linked to one another includes not only a case where (Substituent 1)-(Substituent 2)-(Substituent 3) are consecutively linked to one another, but also a case where (Substituent 2) and (Substituent 3) are linked to (Substituent 1). For example, a phenyl group, a naphthyl group, and an isopropyl group may be linked to one another to form a substituent of

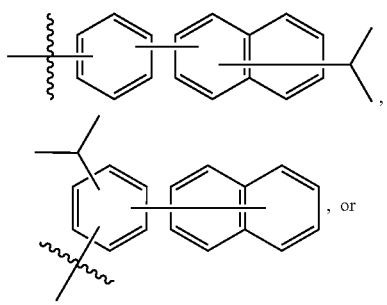

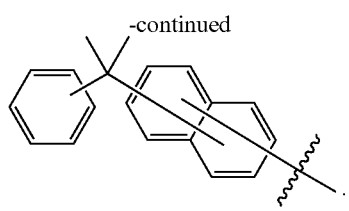

The above-described definition also applies equally to the case where four or more substituents are linked to one another.

In the present disclosure, examples of the halogen group include fluorine, chlorine, bromine or iodine.

In the present disclosure, the alkyl group may be straight-chained or branched, and the number of carbon atoms thereof is not particularly limited, but is preferably 1 to 30. Specific examples thereof include a methyl group, an ethyl group, a propyl group, an n-propyl group, an isopropyl group, a butyl group, an n-butyl group, an isobutyl group, a tert-butyl group, a sec-butyl group, a 1-methyl-butyl group, a 1-ethyl-butyl group, a pentyl group, an n-pentyl group, an isopentyl group, a neopentyl group, a tert-pentyl group, a hexyl group, an n-hexyl group, a 1-methylpentyl group, a 2-methylpentyl group, a 4-methyl-2-pentyl group, a 3,3-dimethylbutyl group, a 2-ethylbutyl group, a heptyl group, an n-heptyl group, a 1-methylhexyl group, a cyclopentylmethyl group, a cyclohexylmethyl group, an octyl group, an n-octyl group, a tert-octyl group, a 1-methylheptyl group, a 2-ethylhexyl group, a 2-propylpentyl group, an n-nonyl group, a 2,2-dimethylheptyl group, a 1-ethyl-propyl group, a 1,1-dimethyl-propyl group, an isohexyl group, a 2-methylpentyl group, a 4-methylhexyl group, a 5-methylhexyl group, and the like, but are not limited thereto.

In the present disclosure, the cycloalkyl group is not particularly limited, but has preferably 3 to 30 carbon atoms, and specific examples thereof include a cyclopropyl group, a cyclobutyl group, a cyclopentyl group, a 3-methylcyclopentyl group, a 2,3-dimethylcyclopentyl group, a cyclohexyl group, a 3-methylcyclohexyl group, a 4-methylcyclohexyl group, a 2,3-dimethylcyclohexyl group, a 3,4,5-trimethylcyclohexyl group, a 4-tert-butylcyclohexyl group, a cycloheptyl group, a cyclooctyl group, an adamantyl group, and the like, but are not limited thereto.

In the present disclosure, the alkoxy group may be straight-chained, branched, or cyclic. The number of carbon atoms of the alkoxy group is not particularly limited, but is preferably 1 to 30. Specific examples thereof include a methoxy group, an ethoxy group, an n-propoxy group, an isopropoxy group, an n-butoxy group, an isobutoxy group, a tert-butoxy group, a sec-butoxy group, an n-pentyloxy group, an neopentyloxy group, an isopentyloxy group, an n-hexyloxy group, a 3,3-dimethylbutyloxy group, a 2-ethylbutyloxy group, an n-octyloxy group, an n-nonyloxy group, an n-decyloxy group, a benzyloxy group, a p-methylbenzyloxy group, and the like, but are not limited thereto.

In the present disclosure, the alkenyl group may be straight-chained or branched, and the number of carbon atoms thereof is not particularly limited, but is preferably 2 to 30. Specific examples thereof include a vinyl group, a 1-propenyl group, an isopropenyl group, a 1-butenyl group, a 2-butenyl group, a 3-butenyl group, a 1-pentenyl group, a 2-pentenyl group, a 3-pentenyl group, a 3-methyl-1-butenyl group, a 1,3-butadienyl group, an allyl group, a 1-phenyl-vinyl-1-yl group, a 2-phenylvinyl-1-yl group, a 2,2-diphenylvinyl-1-yl group, a 2-phenyl-2-(naphthyl-1-yl)vinyl-1-yl group, a 2,2-bis(diphenyl-1-yl)vinyl-1-yl group, a stilbenyl group, a styrenyl group, and the like, but are not limited thereto.

In the present disclosure, an aryl group is not particularly limited, but has preferably 6 to 50 carbon atoms, and the aryl group may be monocyclic or polycyclic.

When the aryl group is a monocyclic aryl group, the number of carbon atoms thereof is not particularly limited, but is preferably 6 to 30. Specific examples of the monocyclic aryl group include a phenyl group, a biphenyl group, a terphenyl group, and the like, but are not limited thereto.

When the aryl group is a polycyclic aryl group, the number of carbon atoms thereof is not particularly limited, but is preferably 10 to 50. Specific examples of the polycyclic aryl group include a naphthyl group, an anthracene group, a phenanthrene group, a triphenylene group, a pyrene group, a phenalene group, a perylene group, a chrysene group, a fluorene group, and the like, but are not limited thereto.

In the present disclosure, the fluorene group may be substituted, and adjacent groups may be bonded to each other to form a ring.

Examples of the case where the fluorene group is substituted include

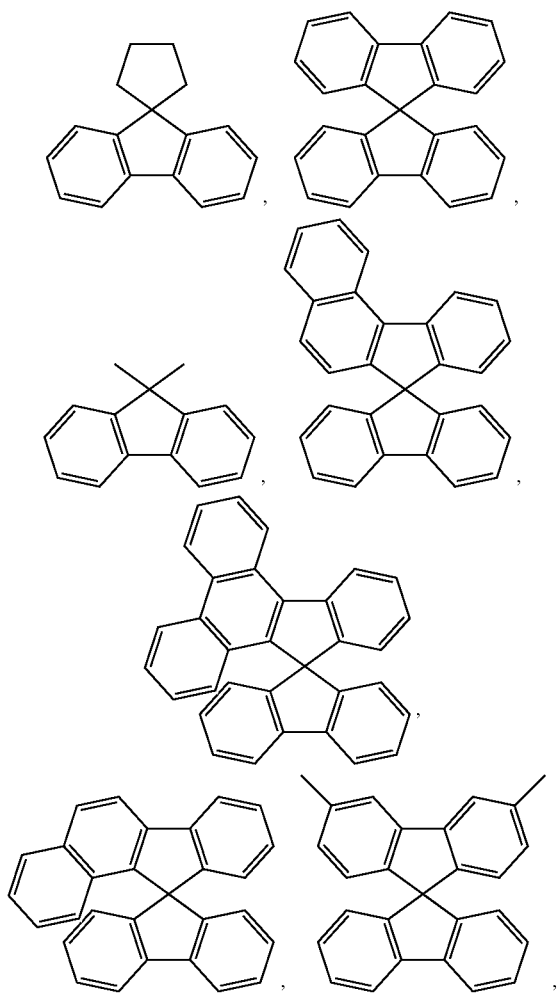

and the like, but are not limited thereto.

In the present disclosure, the "adjacent" group may mean a substituent substituted with an atom directly linked to an atom in which the corresponding substituent is substituted, a substituent disposed to be sterically closest to the corresponding substituent, or another substituent substituted with an atom in which the corresponding substituent is substituted. For example, two substituents substituted at the ortho position in a benzene ring and two substituents substituted with the same carbon in an aliphatic ring may be interpreted as groups which are "adjacent" to each other.

In the present disclosure, the heteroaryl group includes one or more atoms other than carbon, that is, one or more heteroatoms, and specifically, the heteroatom may include one or more atoms selected from the group consisting of O, N, Se, S, and the like. The number of carbon atoms thereof is not particularly limited, but is preferably 2 to 30, and the heteroaryl group may be monocyclic or polycyclic. Examples of the heteroaryl group include a thiophene group, a furan group, a pyrrole group, an imidazole group, a thiazole group, an oxazole group, an oxadiazole group, a pyridine group, a bipyridine group, a pyrimidine group, a triazine group, a triazole group, an acridine group, a pyridazine group, a pyrazine group, a quinoline group, a quinazoline group, a quinoxaline group, a phthalazine group, a pyridopyrimidine group, a pyridopyrazine group, a pyrazinopyrazine group, an isoquinoline group, an indole group, a carbazole group, a benzoxazole group, a benzimidazole group, a benzothiazole group, a benzocarbazole group, a benzothiophene group, a dibenzothiophene group, a benzofuran group, a phenanthridine group, a phenanthroline group, an isoxazole group, a thiadiazole group, a dibenzofuran group, a dibenzosilole group, a phenoxathiin group, a phenoxazine group, a phenothiazine group, a dihydroindenocarbazole group, a spirofluorenexanthene group, a spirofluorenethioxanthene group, a tetrahydronaphthothiophene group, a tetrahydronaphthofuran group, a tetrahydrobenzothiophene group, a tetrahydrobenzofuran group, and the like, but are not limited thereto.

In the present disclosure, the silyl group may be an alkylsilyl group, an arylsilyl group, an alkylarylsilyl group, a heteroarylsilyl group, and the like. The above-described examples of the alkyl group may be applied to the alkyl group in the alkylsilyl group, the above-described examples of the aryl group may be applied to the aryl group in the arylsilyl group, the examples of the alkyl group and the aryl group may be applied to the alkyl group and the aryl group in the alkylarylsilyl group, and the examples of the heterocyclic group may be applied to the heteroaryl group in the heteroarylsilyl group.

In the present disclosure, the hydrocarbon ring group may be an aromatic hydrocarbon ring group, an aliphatic hydrocarbon ring group, or a condensed ring group of an aromatic hydrocarbon ring and an aliphatic hydrocarbon ring and may be selected among examples of the cycloalkyl group, the aryl group, and a combination thereof, and examples of the hydrocarbon ring group include a phenyl group, a cyclohexyl group, an adamantyl group, a bicylo[2.2.1]heptyl group, a bicyclo[2.2.1]octyl group, a tetrahydronaphthalene group, a tetrahydroanthracene group, a 1,2,3,4-tetrahydro-1,4-methanonaphthalene group, a 1,2,3,4-tetrahydro-1,4-ethanonaphthalene group, a spirocyclopentanefluorene group, a spiroadamantanefluorene group, a spirocyclohexanefluorene group, and the like, but are not limited thereto.

In the present disclosure, the aryloxy group may be represented by —ORo, and the description on the above-described aryl group is applied to Ro.

In the present disclosure, the arylthio group may be represented by —SRs1, and the description on the above-described aryl group is applied to Rs1.

In the present disclosure, the alkylthio group may be represented by —SRs2, and the description on the above-described alkyl group is applied to Rs2.

In the present disclosure, an alkylene group means a group having two bonding positions in an alkyl group, that is, a divalent group. The above-described description on the alkyl group may be applied to the alkylene group, except for a divalent alkylene group.

In the present disclosure, the cycloalkylene group means a group having two bonding positions in a cycloalkyl group, that is, a divalent group. The above-described description on the cycloalkyl group may be applied to the cycloalkylene groups, except for a divalent cycloalkylene group.

In the present disclosure, a condensed ring group of a divalent aromatic hydrocarbon ring and an aliphatic hydrocarbon ring means a ring group having two bonding positions in the condensed ring group of the aromatic hydrocarbon ring and the aliphatic hydrocarbon ring, that is, a divalent group. The above-described description on the condensed ring group of the aromatic hydrocarbon ring and the aliphatic hydrocarbon ring may be applied, except that the groups are each a divalent group.

In the present disclosure, an arylene group means a group having two bonding positions in an aryl group, that is, a divalent group. The above-described description on the aryl group may be applied to the arylene group, except that the arylene groups are each a divalent group.

According to an exemplary embodiment of the present disclosure, the polycarbonate resin further includes a unit of the following Chemical Formula 3.

[Chemical Formula 3]

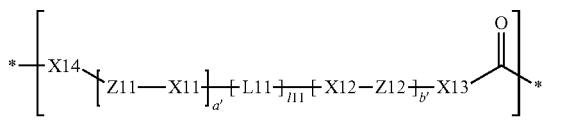

In Chemical Formula 3,
L11 is a substituted or unsubstituted alkylene group; a substituted or unsubstituted cycloalkylene group; a condensed ring group of a divalent aromatic hydrocarbon ring and an aliphatic hydrocarbon ring, which is substituted or unsubstituted; or a substituted or unsubstituted arylene group,
l11 is an integer from 1 to 5, and when l11 is 2 or higher, two or more L11's are the same as or different from each other,
X11 to X14 are the same as or different from each other, and are each independently O; or S, Z11 and Z12 are the same as or different from each other, and are each independently a substituted or unsubstituted alkylene group; or a substituted or unsubstituted cycloalkylene group, a' and b' are the same as or different from each other, and are each independently an integer from 0 to 10, and when a' and b' are each 2 or higher, structures in each parenthesis are the same as or different from each other, and

* means a moiety linked to the main chain of the resin.

By further including the unit represented by Chemical Formula 3, the polycarbonate resin may supplement the glass transition temperature (Tg) of the resin including the units of Chemical Formulae 1 and 2 or make the chain behavior of the polycarbonate resin flexible, and has a technical effect advantageous for the injection processing of a molded article.

An exemplary embodiment of the present disclosure provides a polycarbonate resin including: the unit of Chemical Formula 1; the unit of Chemical Formula 2; and the unit of Chemical Formula 3.

According to an exemplary embodiment of the present disclosure, r2 is 1.

According to an exemplary embodiment of the present disclosure, Chemical Formula 2 is any one of the following Chemical Formulae 2-1 to 2-4.

[Chemical Formula 2-1]

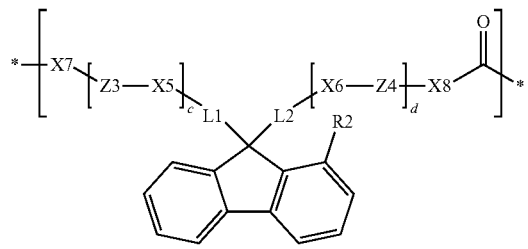

[Chemical Formula 2-2]

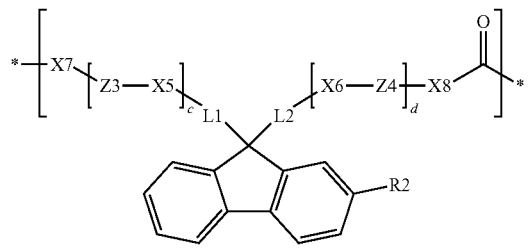

[Chemical Formula 2-3]

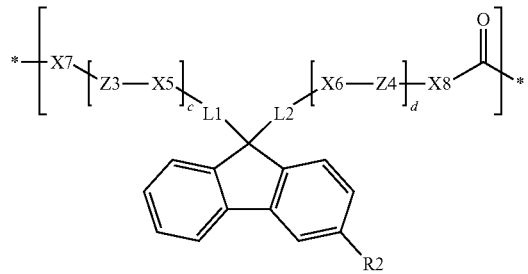

-continued

[Chemical Formula 2-4]

$$*\!-\!\!\left[\!X7\!-\!\!\left[\!Z3\!-\!X5\!\right]_{c}\!\underset{L1}{\overset{}{\diagdown}}\!\!\underset{L2}{\overset{}{\diagup}}\!\left[\!X6\!-\!Z4\!\right]_{d}\!\!X8\!-\!\overset{O}{\overset{\|}{C}}\!\right]\!-\!*$$

R2

In Chemical Formulae 2-1 to 2-4,
the definitions of Z3, Z4, X5 to X8, c, d, L1, L2, and R2 are the same as those defined in Chemical Formula 2.

According to an exemplary embodiment of the present disclosure, Ar1 and Ar2 are the same as or different from each other, and are each independently a monocyclic or polycyclic aryl group having 6 to 30 carbon atoms, which is unsubstituted or substituted with a monocyclic or polycyclic aryl group having 6 to 30 carbon atoms or a monocyclic or polycyclic heteroaryl group having 2 to 30 carbon atoms; or a monocyclic or polycyclic heteroaryl group having 2 to 30 carbon atoms, which is unsubstituted or substituted with a monocyclic or polycyclic aryl group having 6 to 30 carbon atoms, R1 is hydrogen, X1 to X4 are O, and Z1 and Z2 are the same as or different from each other, and are each independently a straight-chained or branched alkylene group having 1 to 30 carbon atoms.

According to an exemplary embodiment of the present disclosure, R2 and R3 are different from each other, and are each independently hydrogen; or an unsubstituted monocyclic or polycyclic aryl group having 6 to 30 carbon atoms, L1 and L2 are the same as or different from each other, and are each independently a monocyclic or polycyclic arylene group having 6 to 30 carbon atoms, X5 to X8 are O, and Z3 and Z4 are the same as or different from each other, and are each independently a straight-chained or branched alkylene group having 1 to 30 carbon atoms.

According to an exemplary embodiment of the present disclosure, Ar1 and Ar2 are the same as or different from each other, and are each independently a monocyclic or polycyclic aryl group having 6 to 30 carbon atoms.

According to an exemplary embodiment of the present disclosure, Ar1 and Ar2 are the same as or different from each other, and are each independently a monocyclic or polycyclic aryl group having 6 to 20 carbon atoms.

According to an exemplary embodiment of the present disclosure, Ar1 and Ar2 are the same as or different from each other, and are each independently a polycyclic aryl group having 10 to 30 carbon atoms.

According to an exemplary embodiment of the present disclosure, Ar1 and Ar2 are the same as or different from each other, and are each independently a polycyclic aryl group having 10 to 20 carbon atoms.

According to an exemplary embodiment of the present disclosure, Ar1 and Ar2 are a naphthyl group.

According to an exemplary embodiment of the present disclosure, R1 is hydrogen.

According to an exemplary embodiment of the present disclosure, X1 is O.

According to an exemplary embodiment of the present disclosure, X2 is O.

According to an exemplary embodiment of the present disclosure, X3 is O.

According to an exemplary embodiment of the present disclosure, X4 is O.

According to an exemplary embodiment of the present disclosure, Z1 and Z2 are the same as or different from each other, and are each independently a straight-chained or branched alkylene group having 1 to 30 carbon atoms.

According to an exemplary embodiment of the present disclosure, Z1 and Z2 are the same as or different from each other, and are each independently a straight-chained or branched alkylene group having 1 to 20 carbon atoms.

According to an exemplary embodiment of the present disclosure, Z1 and Z2 are the same as or different from each other, and are each independently an ethylene group; or an isopropylene group.

According to an exemplary embodiment of the present disclosure, R2 and R3 are different from each other, and are each independently hydrogen; or an unsubstituted monocyclic or polycyclic aryl group having 6 to 30 carbon atoms.

According to an exemplary embodiment of the present disclosure, R2 and R3 are different from each other, and are each independently hydrogen; or an unsubstituted monocyclic or polycyclic aryl group having 6 to 20 carbon atoms.

According to an exemplary embodiment of the present disclosure, R2 and R3 are different from each other, and are each independently hydrogen; or an unsubstituted polycyclic aryl group having 10 to 30 carbon atoms.

According to an exemplary embodiment of the present disclosure, R2 and R3 are different from each other, and are each independently hydrogen; or an unsubstituted polycyclic aryl group having 10 to 20 carbon atoms.

According to an exemplary embodiment of the present disclosure, R2 and R3 are different from each other, and are each independently hydrogen; or a naphthyl group.

According to an exemplary embodiment of the present disclosure, R2 is a naphthyl group.

According to an exemplary embodiment of the present disclosure, R3 is hydrogen.

According to an exemplary embodiment of the present disclosure, L1 and L2 are the same as or different from each other, and are each independently a monocyclic or polycyclic arylene group having 6 to 30 carbon atoms.

According to an exemplary embodiment of the present disclosure, L1 and L2 are the same as or different from each other, and are each independently a monocyclic or polycyclic arylene group having 6 to 20 carbon atoms.

According to an exemplary embodiment of the present disclosure, L1 and L2 are the same as or different from each other, and are each independently a polycyclic arylene group having 10 to 30 carbon atoms.

According to an exemplary embodiment of the present disclosure, L1 and L2 are the same as or different from each other, and are each independently a polycyclic arylene group having 10 to 20 carbon atoms.

According to an exemplary embodiment of the present disclosure, L1 and L2 are a divalent naphthalene group.

According to an exemplary embodiment of the present disclosure, X5 is O.

According to an exemplary embodiment of the present disclosure, X6 is O.

According to an exemplary embodiment of the present disclosure, X7 is O.

According to an exemplary embodiment of the present disclosure, X8 is O.

According to an exemplary embodiment of the present disclosure, Z3 and Z4 are the same as or different from each other, and are each independently a straight-chained or branched alkylene group having 1 to 30 carbon atoms.

According to an exemplary embodiment of the present disclosure, Z3 and Z4 are the same as or different from each other, and are each independently a straight-chained or branched alkylene group having 1 to 20 carbon atoms.

According to an exemplary embodiment of the present disclosure, Z3 and Z4 are an ethylene group.

According to an exemplary embodiment of the present disclosure, a is 1.

According to an exemplary embodiment of the present disclosure, b is 1.

According to an exemplary embodiment of the present disclosure, c is 1.

According to an exemplary embodiment of the present disclosure, d is 1.

According to an exemplary embodiment of the present disclosure, a is 0.

According to an exemplary embodiment of the present disclosure, b is 0.

According to an exemplary embodiment of the present disclosure, c is 0.

According to an exemplary embodiment of the present disclosure, d is 0.

According to an exemplary embodiment of the present disclosure, L11 is a monocyclic or polycyclic alkylene group having 1 to 30 carbon atoms; a condensed ring group of a divalent monocyclic or polycyclic aromatic hydrocarbon ring having 6 to 30 carbon atoms and an aliphatic hydrocarbon ring having 3 to 30 carbon atoms; or a monocyclic or polycyclic arylene group having 6 to 50 carbon atoms, which is unsubstituted with or substituted with a straight-chained or branched alkyl group having 1 to 30 carbon atoms or a monocyclic or polycyclic aryl group having 6 to 30 carbon atoms.

According to an exemplary embodiment of the present disclosure, L11 is a monocyclic or polycyclic alkylene group having 1 to 20 carbon atoms; a condensed ring group of a divalent monocyclic or polycyclic aromatic hydrocarbon ring having 6 to 20 carbon atoms and an aliphatic hydrocarbon ring having 3 to 20 carbon atoms; or a monocyclic or polycyclic arylene group having 6 to 30 carbon atoms, which is unsubstituted with or substituted with a straight-chained or branched alkyl group having 1 to 20 carbon atoms or a monocyclic or polycyclic aryl group having 6 to 20 carbon atoms.

According to an exemplary embodiment of the present disclosure, L11 is a methylene group which is unsubstituted or substituted with a methyl group; an isopropylene group; a phenylene group which is unsubstituted or substituted with a methyl group or a phenyl group; a divalent naphthalene group; or a divalent fluorene group.

According to an exemplary embodiment of the present disclosure, l11 is 1.

According to an exemplary embodiment of the present disclosure, l11 is 2, and two L11's are the same as or different from each other.

According to an exemplary embodiment of the present disclosure, l11 is 3, and three L11's are the same as or different from each other.

According to an exemplary embodiment of the present disclosure, X11 is O.

According to an exemplary embodiment of the present disclosure, X12 is O.

According to an exemplary embodiment of the present disclosure, X13 is O.

According to an exemplary embodiment of the present disclosure, X14 is O.

According to an exemplary embodiment of the present disclosure, Z11 and Z12 are the same as or different from each other, and are each independently a straight-chained or branched alkylene group having 1 to 30 carbon atoms.

According to an exemplary embodiment of the present disclosure, Z11 and Z12 are the same as or different from each other, and are each independently a straight-chained or branched alkylene group having 1 to 20 carbon atoms.

According to an exemplary embodiment of the present disclosure, Z11 and Z12 are an ethylene group.

According to an exemplary embodiment of the present disclosure, a' is 1.

According to an exemplary embodiment of the present disclosure, b' is 1.

According to an exemplary embodiment of the present disclosure, a' is 0.

According to an exemplary embodiment of the present disclosure, b' is 0.

According to an exemplary embodiment of the present disclosure, the polycarbonate resin may have —OH; —SH; —CO$_2$CH$_3$; —Cl; or —OC$_6$H$_5$ as an end group.

In an exemplary embodiment of the present disclosure, the polycarbonate resin has a weight average molecular weight of 5,000 g/mol to 500,000 g/mol, preferably 7,000 g/mol to 400,000 g/mol, 8,000 g/mol to 300,000 g/mol, 9,000 g/mol to 200,000 g/mol. The polycarbonate resin has a weight average molecular weight of more preferably 10,000 g/mol to 100,000 g/mol, 10,000 g/mol to 80,000 g/mol, 15,000 g/mol to 70,000 g/mol, 18,000 g/mol to 65,000 g/mol.

In an exemplary embodiment of the present invention, the polycarbonate resin has a number average molecular weight of 2,000 g/mol to 250,000 g/mol, 3,000 g/mol to 200,000 g/mol, 4,000 g/mol to 180,000 g/mol, 5,000 g/mol to 150,000 g/mol, preferably 8,000 g/mol to 100,000 g/mol.

When the polycarbonate resin satisfies the above-described weight average molecular weight and number average molecular weight ranges, the polycarbonate resin may have optimum fluidity and processability.

The weight average molecular weight and number average molecular weight of the polycarbonate resin are polystyrene equivalent weight average molecular weights.

In the present disclosure, the weight average molecular weights and number average molecular weights of the polycarbonate resin and the oligomer used in the preparation thereof may be measured by gel permeation chromatograph (GPC) using a polystyrene (PS) standard using Agilent 1200 series. Specifically, the weight average molecular weights may be measured using an Agilent 1200 series device using a Polymer Laboratories PLgel MIX-B 300 mm length column, and in this case, the measurement temperature is 40° C., the used solvent is tetrahydrofuran (THF), and the flow rate is 1 mL/min. The sample of the polycarbonate resin or oligomer is each prepared at a concentration of 10 mg/10 mL, and then fed in an amount of 10 μL, and the weight average molecular weight (Mw) value is induced using a calibration curve formed using a polystyrene standard. In this case, nine types of polystyrene standard products with a molecular weight (g/mol) of 2,000/10,000/30,000/70,000/200,000/700,000/2,000,000/4,000,000/10,000,000 are used.

In an exemplary embodiment of the present disclosure, the polycarbonate resin may have a glass transition temperature (Tg) of 80° C. to 200° C. Alternatively, the glass transition temperature may be 85° C. to 190° C. The glass transition temperature may be preferably 100° C. to 180° C., 120° C. to 170° C., or 130° C. to 160° C., and specifically 85.0° C. to 168.0° C.

When the polycarbonate resin satisfies the above glass transition temperature range, the glass transition temperature is easily adjusted when a polycarbonate resin composition is prepared by mixing with a resin having excellent heat resistance and injectability and having a glass transition temperature different from the above-described range, so that the physical properties desired in the present disclosure may be satisfied.

The glass transition temperature (Tg) may be measured by a differential scanning calorimeter (DSC). Specifically, the glass transition temperature may be measured from a graph obtained by heating 5.5 mg to 8.5 mg of the polycarbonate resin sample to 270° C. under a nitrogen atmosphere, and then scanning the resin sample while heating the resin sample at a heating rate of 10° C./min during the second heating after cooling.

In an exemplary embodiment of the present disclosure, a refractive index of the polycarbonate resin, which is measured at a wavelength of 587 nm, is 1.50 to 1.75. The refractive index may be preferably 1.65 to 1.712, specifically, 1.607 to 1.709. When the resin satisfies the above refractive index, a thin and light optical lens can be manufactured when the resin is applied to a molded article such as an optical lens.

In an exemplary embodiment of the present disclosure, the Abbe's Number of the resin, which is measured and calculated at a wavelength of 486, 587, and 656 nm may be 5 to 45. The Abbe's Number may be preferably 10 to 25, and more preferably 14 to 20. The Abbe's Number may be specifically 14.0 to 26.5.

When the resin satisfies the above Abbe's Number range, there is an effect that the dispersion is decreased and the sharpness is increased when the resin is applied to a molded product such as an optical lens. The Abbe's Number may specifically be obtained by the following Equation by measuring the refractive index ($n_D$, $n_F$, and $n_C$) at a wavelength of D (587 nm), F (486 nm), and C (656 nm), respectively at 20° C.

$$\text{Abbe's Number} = (n_D - 1)/(n_F - n_C)$$

The refractive index and the Abbe's Number may be measured from a film prepared by applying a solution prepared by dissolving the resin in a solvent to a silicon wafer by spin-coating, and may be measured by obtaining the result value according to the wavelength of light using an ellipsometer at 20° C. for the applied film. The solution may be applied by the spin-coating at a rotation speed of 150 rpm to 300 rpm, and the applied film may have a thickness of 5 µm to 20 µm. The silicon wafer is not particularly limited, and any silicon wafer that can measure the refractive index and the Abbe's Number of the resin composition according to the present disclosure may be appropriately adopted. The solvent may be dimethylacetamide or 1,2-dichlorobenzene, and the solution may be prepared by dissolving the resin sample in an amount of 10 wt % based on the total weight of the solution.

An exemplary embodiment of the present invention provides a method for preparing a polycarbonate resin, the method including: polymerizing a composition for preparing the polycarbonate resin, which includes a compound represented by the following Chemical Formula 1a; a compound represented by the following Chemical Formula 2a; and a polycarbonate precursor.

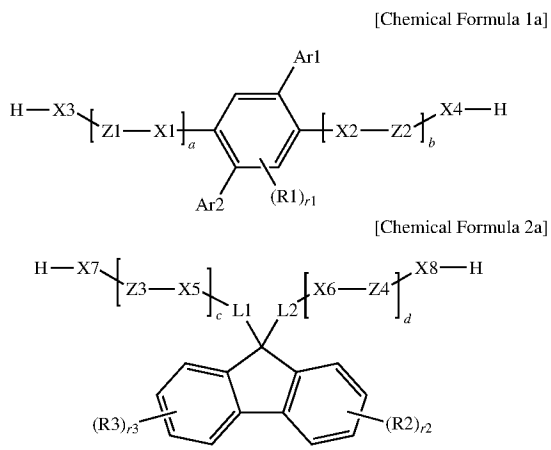

[Chemical Formula 1a]

[Chemical Formula 2a]

In Chemical Formulae 1a and 2a,

Ar1 and Ar2 are the same as or different from each other, and are each independently a substituted or unsubstituted aryl group; or a substituted or unsubstituted heteroaryl group, R1 is hydrogen; deuterium; a halogen group; a cyano group; a substituted or unsubstituted alkyl group; a substituted or unsubstituted cycloalkyl group; a substituted or unsubstituted alkoxy group; a substituted or unsubstituted silyl group; a substituted or unsubstituted aryl group; or a substituted or unsubstituted heteroaryl group, R2 and R3 are different from each other, and are each independently hydrogen; deuterium; a halogen group; a cyano group; a substituted or unsubstituted alkyl group; a substituted or unsubstituted cycloalkyl group; a substituted or unsubstituted alkoxy group; a substituted or unsubstituted silyl group; an aryl group which is unsubstituted or substituted with deuterium, a halogen group, a hydroxyl group, a cyano group, an alkyl group, a cycloalkyl group, an alkoxy group, an alkenyl group, an aryloxy group, an arylthio group, an alkylthio group, an aryl group, or a heteroaryl group; or a substituted or unsubstituted heteroaryl group, r1 is 1 or 2, and when r1 is 2, two R1's are the same as or different from each other, r2 and r3 are each an integer from 1 to 4, and when r2 is 2 or higher, two or more R2's are the same as or different from each other, and when r3 is 2 or higher, two or more R3's are the same as or different from each other, L1 and L2 are the same as or different from each other, and are each independently a substituted or unsubstituted arylene group, X1 to X8 are the same as or different from each other, and are each independently O; or S, Z1 to Z4 are the same as or different from each other, and are each independently a substituted or unsubstituted alkylene group; or a substituted or unsubstituted cycloalkylene group, and a, b, c and d are the same as or different from each other, and are each independently an integer from 1 to 10, and when a and b are each 2 or higher, structures in each parenthesis are the same as or different from each other.

According to an exemplary embodiment of the present disclosure, the method for preparing the polycarbonate resin further includes a compound of the following Chemical Formula 3a, and the compound of Chemical Formula 1a, Chemical Formula 2a, and Chemical Formula 3a are included in amounts of 0.01 mole % to 99.99 mole %:0.01 mole % to 99.99 mole %:0 mole % to 99.98 mole %, specifically 0.1 mole % to 99.9 mole %:0.1 mole % to 99.9 mole %:0 mole % to 99.8 mole %, and more specifically 1 mole % to 99 mole %:1 mole % to 99 mole %:0 mole % to 98 mole %, 5 mole % to 95 mole %:95 mole % to 5 mole %:0 mole % to 90 mole %, 10 mole % to 90 mole %:90 mole % to 10 mole %:0 mole % to 80 mole %.

[Chemical Formula 3a]

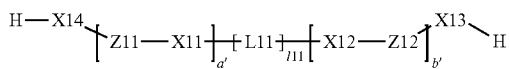

In Chemical Formula 3a,

L11 is a substituted or unsubstituted alkylene group; a substituted or unsubstituted cycloalkylene group; a condensed ring group of a divalent aromatic hydrocarbon ring and an aliphatic hydrocarbon ring, which is substituted or unsubstituted; or a substituted or unsubstituted arylene group, l11 is an integer from 1 to 5, and when l11 is 2 or higher, two or more L11's are the same as or different from each other, X11 to X14 are the same as or different from each other, and are each independently O; or S, Z11 and Z12 are the same as or different from each other, and are each independently a substituted or unsubstituted alkylene group; or a substituted or unsubstituted cycloalkylene group, and a' and b' are the same as or different from each other, and are each independently an integer from 0 to 10, and when a' and b' are each 2 or higher, structures in each parenthesis are the same as or different from each other.

An exemplary embodiment of the present invention provides a method for preparing a polycarbonate resin, the method including: polymerizing a composition for preparing the polycarbonate resin, which includes the compound of Chemical Formula 1a; the compound of Chemical Formula 2a; and a polycarbonate precursor. The compound of Chemical Formula 1a and Chemical Formula 2a are included in amounts of 0.01 mole % to 99.99 mole %:99.99 mole % to 0.01 mole %. The compound of Chemical Formula 1a and Chemical Formula 2a are included in amounts of specifically 0.1 mole % to 99.9 mole %:99.9 mole % to 0.1 mole %, 1 mole % to 99 mole %:99 mole % to 1 mole %, 5 mole % to 95 mole %:95 mole % to 5 mole %, 10 mole % to 90 mole %:90 mole % to 10 mole %.

When Chemical Formulae 1a and 2a are included in the above contents, the compounds are easily polymerized, have a wide range of refractive indices or a high refractive index depending on the substituent, and have a wide range of glass transition temperatures.

An exemplary embodiment of the present invention provides a method for preparing a polycarbonate resin, the method including: polymerizing a composition for preparing the polycarbonate resin, which includes the compound of Chemical Formula 1a; the compound of Chemical Formula 2a; the compound of Chemical Formula 3a; and a polycarbonate precursor. The compound of Chemical Formula 1a, Chemical Formula 2a, and Chemical Formula 3a are included in amounts of 0.01 mole % to 99.99 mole %:0.01 mole % to 99.99 mole %: 0 mole % to 99.98 mole %, specifically 0.1 mole % to 99.9 mole %:0.1 mole % to 99.9 mole %:0 mole % to 99.8 mole %, and more specifically 1 mole % to 99 mole %:1 mole % to 99 mole %:0 mole % to 98 mole %, 5 mole % to 95 mole %:95 mole % to 5 mole %:0 mole % to 90 mole %, 10 mole % to 90 mole %:90 mole % to 10 mole %:0 mole % to 80 mole %.

When Chemical Formulae 1a, 2a and 3a are included in the above content, the glass transition temperature (Tg) and refractive index can be adjusted, and the chain behavior of the polycarbonate resin can be made flexible, so that there is a technical effect advantageous for the injection processing of a molded article.

The composition for preparing a polycarbonate resin may further include a solvent.

The solvent may be, for example, diphenyl ether, dimethylacetamide or methanol, but is not limited thereto, and any solvent applied in the art may be appropriately adopted.

The solvent may be included in an amount of 5 parts by weight to 60 parts by weight with respect to 100 parts by weight of the composition for preparing a resin.

The solvent may be included in an amount of preferably 5 parts by weight to 50 parts by weight, 7 parts by weight to 45 parts by weight or 8 parts by weight to 40 parts by weight with respect to 100 parts by weight of the composition for preparing a resin.

According to an exemplary embodiment of the present disclosure, two or more of Chemical Formula 1a may be included. Two or more of Chemical Formula 1a are the same as or different from each other.

In an exemplary embodiment of the present invention, the compound of Chemical Formula 1a may be any one selected among the following compounds, but is not limited thereto.

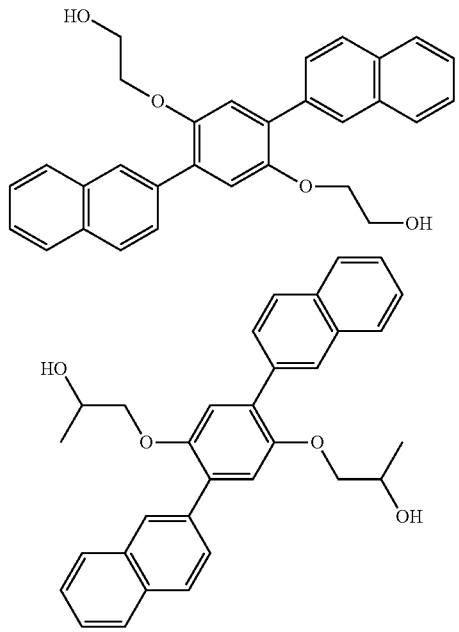

In an exemplary embodiment of the present invention, the compound of Chemical Formula 2a may be the following compound, but is not limited thereto.

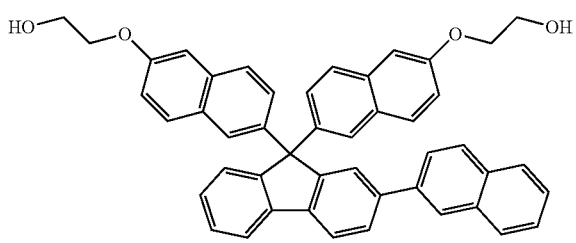 [SMILES: OCCOc1ccc2cc(C3(c4ccc5cc(OCCO)ccc5c4)c4ccccc4-c4ccc(-c5ccc6ccccc6c5)cc43)ccc2c1]

In an exemplary embodiment of the present invention, the compound of Chemical Formula 3a may be the following compound, but is not limited thereto.

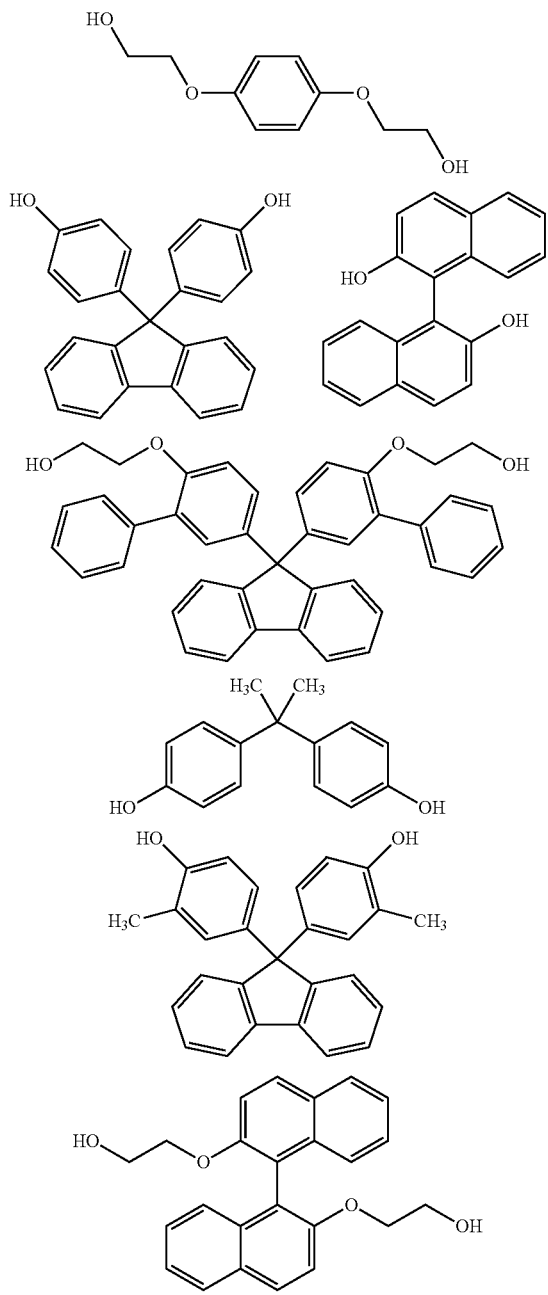

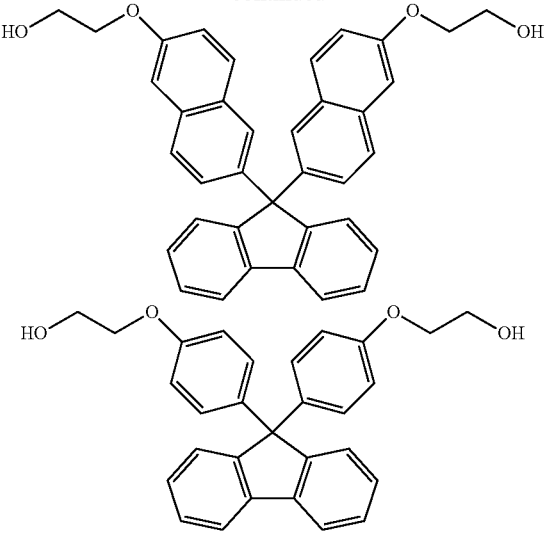

In an exemplary embodiment of the present disclosure, the compound of Chemical Formula 1a may be included in an amount of 1 part by weight to 99 parts by weight with respect to 100 parts by weight of the composition for preparing a polycarbonate resin.

The compound of Chemical Formula 1a may be included in an amount of preferably 1 to 60 parts by weight, 1 to 50 parts by weight, 1 to 40 parts by weight, 1 to 30 parts by weight, 1 to 20 parts by weight or 1 to 10 parts by weight with respect to 100 parts by weight of the composition for preparing a polycarbonate resin.

In an exemplary embodiment of the present disclosure, the compound of Chemical Formula 2a may be included in an amount of 1 part by weight to 99 parts by weight with respect to 100 parts by weight of the composition for preparing a polycarbonate resin.

The compound of Chemical Formula 2a may be included in an amount of preferably 1 to 60 parts by weight, 1 to 50 parts by weight, 1 to 40 parts by weight, 1 to 30 parts by weight, 1 to 20 parts by weight or 1 to 10 parts by weight with respect to 100 parts by weight of the composition for preparing a polycarbonate resin.

In an exemplary embodiment of the present disclosure, the polycarbonate precursor may be included in an amount of 1 part by weight to 60 parts by weight with respect to 100 parts by weight of the composition for preparing a polycarbonate resin.

The polyester precursor may be included in an amount of preferably 1 to 60 parts by weight, 1 to 55 parts by weight, 1 to 50 parts by weight, 1 to 45 parts by weight or 1 to 40 parts by weight with respect to 100 parts by weight of the composition for preparing a polycarbonate resin.

In an exemplary embodiment of the present disclosure, the compound of Chemical Formula 3a may be included in an amount of 0 part by weight to 98 parts by weight with respect to 100 parts by weight of the composition for preparing a polycarbonate resin.

The compound of Chemical Formula 3a may be included in an amount of preferably 0 to 60 parts by weight, 1 to 50 parts by weight, 0 to 40 parts by weight, 0 to 30 parts by weight, 0 to 20 parts by weight or 0 to 10 parts by weight with respect to 100 parts by weight of the composition for preparing a polycarbonate resin.

According to an exemplary embodiment of the present disclosure, the polycarbonate precursor is the following Chemical Formula A.

[Chemical Formula A]

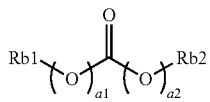

In Chemical Formula A,

Rb1 and Rb2 are the same as or different from each other, and are each independently a halogen group; a substituted or unsubstituted alkyl group; or a substituted or unsubstituted aryl group, and a1 and a2 are each 0 or 1.

According to an exemplary embodiment of the present disclosure, Rb1 and Rb2 are the same as or different from each other, and are each independently a halogen group; a substituted or unsubstituted straight-chained or branched alkyl group having 1 to 30 carbon atoms; or a substituted or unsubstituted monocyclic or polycyclic aryl group having 6 to 30 carbon atoms.

According to an exemplary embodiment of the present disclosure, Rb1 and Rb2 are the same as or different from each other, and are each independently a halogen group; a substituted or unsubstituted straight-chained or branched alkyl group having 1 to 20 carbon atoms; or a substituted or unsubstituted monocyclic or polycyclic aryl group having 6 to 20 carbon atoms.

According to an exemplary embodiment of the present disclosure, Rb1 and Rb2 are the same as or different from each other, and are each independently a halogen group; a straight-chained or branched alkyl group having 1 to 30 carbon atoms; or a monocyclic or polycyclic aryl group having 6 to 30 carbon atoms.

According to an exemplary embodiment of the present disclosure, Rb1 and Rb2 are the same as or different from each other, and are each independently a halogen group; a straight-chained or branched alkyl group having 1 to 20 carbon atoms; or a monocyclic or polycyclic aryl group having 6 to 20 carbon atoms.

According to an exemplary embodiment of the present disclosure, Rb1 and Rb2 are the same as or different from each other, and are each independently —Cl; a methyl group; an ethyl group; an n-propyl group; an isopropyl group; an n-butyl group; or a phenyl group.

According to an exemplary embodiment of the present disclosure, Chemical Formula A is any one selected from the following compounds.

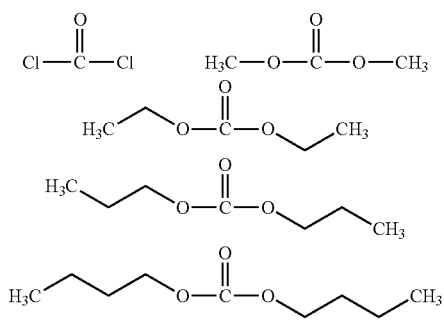

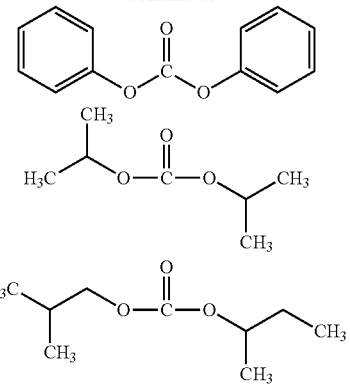

In the case of the polyester resin, the precursor (terephthalate

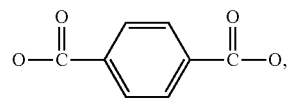

and the like) has a higher molecular weight than the precursor (carbonate

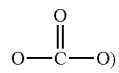

of the polycarbonate resin, and accounts for a large proportion of the weight of the resin. Since the precursor lowers the concentration of a diol monomer which implements a high refractive index, the refractive index of the polycarbonate resin is relatively higher than that of the polyester resin. In addition, the polyester resin has a large length of the conjugated bond due to the structural feature compared to polycarbonate resin, and has a disadvantage in that the yellow index is generally high due to intramolecular hydrogen bonding.

The polycarbonate precursor serves to link an additional comonomer, if necessary, and other specific examples thereof which may be applied in addition to the compound represented by Chemical Formula A include phosgene, triphosgene, diphosgene, bromophosgene, dimethyl carbonate, diethyl carbonate, dibutyl carbonate, dicyclohexyl carbonate, ditolyl carbonate, bis(chlorophenyl) carbonate, m-cresyl carbonate, dinaphthyl carbonate, bis(diphenyl) carbonate, bishaloformate, or the like, and any one of them or a mixture of two or more thereof may be used.

In an exemplary embodiment of the present disclosure, it is preferred that the polycarbonate resin is polymerized from the compound of Chemical Formula 1a; Chemical Formula 2a and the polyester precursor of Chemical Formula A.

By polymerizing the compound of Chemical Formula 1a and the polycarbonate precursor of Chemical Formula A, the unit of the above-described Chemical Formula 1 may be formed.

The compound of Chemical Formula 1a may be used in an amount of 1 part by mol to 99 parts by mol with respect to 100 parts by mol of the entire monomer constituting the polycarbonate resin including the unit of Chemical Formula 1.

The polycarbonate polycarbonate precursor of Chemical Formula A may be used in an amount of 1 part by mol to 150 parts by mol, and 50 parts by mol to 150 parts by mol with respect to 100 parts by mol of the entire monomer of the compound of Chemical Formula 1a constituting the resin.

By polymerizing the compound of Chemical Formula 2a and the polycarbonate precursor of Chemical Formula A, the unit of the above-described Chemical Formula 2 may be formed.

The compound of Chemical Formula 2a may be used in an amount of 1 part by mol to 99 parts by mol with respect to 100 parts by mol of the entire monomer constituting the polycarbonate resin including the unit of Chemical Formula 2.

The polycarbonate polyester precursor of Chemical Formula A may be used in an amount of 1 part by mol to 150 parts by mol, and 50 parts by mol to 150 parts by mol with respect to 100 parts by mol of the entire monomer of the compound of Chemical Formula 2a constituting the resin.

In an exemplary embodiment of the present disclosure, the polycarbonate resin may further include the unit of Chemical Formula 3.

By polymerizing the compound of Chemical Formula 3a and the polycarbonate precursor of Chemical Formula A, the unit of the above-described Chemical Formula 3 may be formed.

The compound of Chemical Formula 3a may be used in an amount of 0 part by mol to 98 parts by mol with respect to 100 parts by mol of the entire monomer constituting the polycarbonate resin including the unit of Chemical Formula 3.

The polycarbonate polyester precursor of Chemical Formula A may be used in an amount of 1 part by mol to 150 parts by mol, and 50 parts by mol to 150 parts by mol with respect to 100 parts by mol of the entire monomer of the compound of Chemical Formula 3a constituting the resin.

For the polymerization of the resin according to the present disclosure, methods known in the art may be used.

It is preferred that the polymerization is performed by a melt polycondensation method.

In the melt polycondensation method, a catalyst may be further applied as needed using the composition for preparing a polycarbonate resin, and melt polycondensation may be performed under heating and further under normal pressure or reduced pressure while removing by-products by an ester exchange reaction. As the catalyst, a material generally applied in the art may be adopted.

Specifically, in the melt polycondensation method, it is preferred that the compound of Chemical Formula 1a; the compound of Chemical Formula 2a; and the polycarbonate precursor are melted in a reaction vessel, and then a reaction is performed in a state where a by-product compound is allowed to stay. The preparation method may further include the compound of Chemical Formula 3a.

In order to allow the by-product compound to stay, pressure may be controlled by closing the reaction device, or reducing pressure or increasing pressure.

The reaction time of this process is 20 minutes or more and 600 minutes or less, preferably 40 minutes or more and 450 minutes or less, and more preferably 60 minutes or more and 300 minutes or less.

In this case, when the by-product compound is distilled off immediately after being produced, a resin to be finally obtained has a small content of high molecular weight materials. However, when the by-produced compound is allowed to stay in the reaction vessel for a certain period of time, the finally obtained resin is obtained to have a large content of high molecular weight materials.

The melt polycondensation method may be performed continuously or in a batch manner. The reaction device used for performing the reaction may be a vertical type equipped with an anchor type impeller, a Maxblend impeller, a helical ribbon type impeller or the like, may be a horizontal type equipped with a paddle blade, a lattice blade, a spectacle-shaped blade or the like, and may be an extruder type equipped with a screw. In addition, it is desirable to use a reaction device that appropriately combines these reaction devices in consideration of the viscosity of the polymer.

In the method for preparing a polycarbonate resin used in the present disclosure, the catalyst may be removed or deactivated in order to maintain heat stability and hydrolysis stability after the completion of the polymerization reaction. A method of deactivating the catalyst by adding a known acidic material in the art may be preferably performed.

As the acidic material, for example, esters such as butyl benzoate, aromatic sulfonic acids such as p-toluenesulfonic acid; aromatic sulfonic acid esters such as butyl p-toluenesulfonate and hexyl p-toluenesulfonate; phosphoric acids such as phosphorous acid, phosphoric acid and phosphonic acid; phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite and monooctyl phosphite, phosphoric acid esters such as triphenyl phosphate, diphenyl phosphate, monophenyl phosphate, dibutyl phosphate, dioctyl phosphate and monooctyl phosphate; phosphonic acids such as diphenylphosphonic acid, dioctylphosphonic acid and dibutylphosphonic acid; phosphonic acid esters such as diethyl phenylphosphonate; phosphines such as triphenylphosphine and bis(diphenylphosphino) ethane; boric acids such as boric acid and phenylboric acid; aromatic sulfonic acid salts such as dodecylbenzenesulfonic acid tetrabutylphosphonium salts; organic halides such as stearic acid chloride, benzoyl chloride and p-toluenesulfonic acid chloride; alkylsulfuric acids such as dimethylsulfuric acid; organic halides such as benzyl chloride, and the like are preferably used.

The acidic material may be used in an amount of 0.1 parts by mol to 5 parts by mol, preferably 0.1 parts by mol to 1 part by mol with respect to 100 parts by mol of the catalyst.

When the amount of the acidic material is smaller than 0.1 parts by mol, the deactivation effect becomes insufficient, which is not preferred. Further, when the amount exceeds 5 parts by mol, the heat resistance of the resin deteriorates and the molded article is easily colored, which is not preferred.

After the catalyst is deactivated, a process of devolatilizing a low boiling point compound in the resin may be further performed under a pressure of 0.1 mmHg to 1 mmHg and at a temperature of 200° C. to 350° C. In this process, a horizontal-type apparatus equipped with a stirring blade having excellent surface renewal ability such as a paddle blade, a lattice blade, and a spectacle-shaped blade, or a thin film evaporator is preferably used.

It is preferred that the content of foreign materials in the resin of the present disclosure is as small as possible, and filtration of a melting raw material, filtration of a catalyst solution, and the like are preferably performed.

The mesh of the filter used in the filtration is preferably 5 μm or less, and more preferably 1 μm or less. In addition, filtration of the produced resin using a polymer filter is preferably performed. The mesh of the polymer filter is preferably 100 μm or less, and more preferably 30 μm or less. Furthermore, a process of obtaining a resin pellet needs to be performed in a low-dust environment, and the environment is preferably Class 6 or lower, and more preferably Class 5 or lower.

Further, examples of a method of molding a molded article including the polycarbonate resin include compression molding, molds, roll processing, extrusion molding, stretching, and the like in addition to injection molding, but are not limited thereto.

Another exemplary embodiment of the present disclosure provides a polycarbonate resin composition including the resin according to the above-described exemplary embodiments.

In an exemplary embodiment of the present disclosure, the polycarbonate resin may be included in an amount of 1 part by weight to 80 parts by weight based on 100 parts by weight of the polycarbonate resin composition.

In an exemplary embodiment of the present disclosure, the polycarbonate resin composition may further include a solvent. The solvent may be, for example, dimethylacetamide or 1,2-dichlorobenzene.

The solvent may be included in an amount of 20 parts by weight to 99 parts by weight based on 100 parts by weight of the polycarbonate resin composition.

The polycarbonate resin composition may further include an additional monomer in addition to the compound of Chemical Formula 1a and the compound of Chemical Formula 2a. The additional monomer is not particularly limited, and a monomer generally applied in the art related to polycarbonate may be appropriately adopted as long as the main physical properties of the polycarbonate resin composition are not changed. The additional monomer may be used in an amount of 1 part by mol to 50 parts by mol with respect to 100 parts by mol of the entire monomer constituting the resin including the unit of Chemical Formula 1.

The polycarbonate resin composition may further include one or more selected from the group consisting of an additive, for example, an antioxidant, a plasticizer, an antistatic agent, a nucleating agent, a flame retardant, a lubricant, an impact modifier, a fluorescent brightener, a UV absorber, a pigment and a dye, if necessary, in addition to a resin including the unit of Chemical Formula 1 and the unit of Chemical Formula 2.

The additive may be included in an amount of 1 part by weight to 99 parts by weight based on 100 parts by weight of the polycarbonate resin composition.

The type of antioxidant, plasticizer, anti-static agent, nucleating agent, flame retardant, lubricant, impact modifier, fluorescent brightener, UV absorber, pigment or dye is not particularly limited, and those applied in the art may be appropriately adopted.

Still another exemplary embodiment of the present disclosure provides a molded article including the polycarbonate resin composition according to the above-described exemplary embodiments.

In an exemplary embodiment of the present disclosure, the molded article may be prepared from the polycarbonate resin composition or a cured product thereof.

As an example of a method of preparing the molded article, it is possible to include mixing a resin including the unit of Chemical Formula 1 and the additive well using a mixer, preparing the resulting mixture as a pellet by extrusion molding the mixture using an extruder, drying the pellet, and then injecting the pellet using an injection molding machine.

In an exemplary embodiment of the present disclosure, the molded article is an optical lens.

In an exemplary embodiment of the present disclosure, the optical lens has a thickness of 0.1 μm to 30 mm.

According to the difference in the refractive index of the optical lens, the position of the focal point where the light is focused varies in the lenses having the same thickness. This is illustrated in the FIGURE. This changes the position of the focal point focused between a camera lens and an image sensor and between the spectacle lens and the human pupil, and the thickness of the lens and film is reduced as the refractive index is increased to adjust the focal point at the same position. An optical lens according to an exemplary embodiment of the present disclosure has a high refractive index, and thus may implement an optical lens with a small thickness.

The optical lens is manufactured using the polycarbonate resin, has a small thickness, a high refractive index and high transparency, and may be preferably applied to a camera.

In an exemplary embodiment of the present disclosure, the molded article is an optical film or optical thin film. The optical film or optical thin film is manufactured using the polycarbonate resin, has a small thickness and excellent light harvesting effect and light diffusion effect, and may be preferably applied to backlight modules, flat lenses, and meta lenses of liquid crystal displays, and the like.

In an exemplary embodiment of the present disclosure, the optical film or optical thin film has a thickness of 0.1 nm to 10 mm.

In an exemplary embodiment of the present disclosure, the molded article is an optical resin. The optical resin is manufactured using the polycarbonate resin, and has a low optical loss due to its small thickness, high refractive index and low birefringence.

The optical resin according to an exemplary embodiment of the present disclosure has a low optical loss due to its high refractive index and low birefringence. The optical resin according to an exemplary embodiment of the present disclosure has a glass transition temperature of 80° C. to 200° C., which is not very high or low in heat resistance characteristics compared to general optical materials in the related art, and thus is easily processed and shows excellent heat resistance characteristics. When the glass transition temperature exceeds 200° C., it is difficult to process the optical resin because the melt flow index increases, and when the glass transition temperature is less than 80° C., the low heat resistance characteristics result in poor weatherability due to the external environment. Accordingly, there are few optical resins according to an exemplary embodiment of the present disclosure, which have suitable thermal properties and implement a high refractive index.

MODE FOR INVENTION

Hereinafter, the present disclosure will be exemplified in more detail through Examples.

Preparation Example 1: Preparation of Resin 1

31.537 g (0.070 mol) of Monomer 1-1, 14.358 g (0.030 mol) of Monomer 2-1, and 21.422 g (0.100 mol) of diphenylcarbonate were melted and reacted at 250° C. for 5 hours. As the reaction proceeded, phenol was generated as a by-product, and the degree of decompression was adjusted up to 1 Torr to remove the phenol. After completion of the reaction, Resin 1, which is a polymerized polymer molten resin, was obtained by blowing nitrogen into the reactor to create a normal pressure atmosphere.

Monomer 1-1
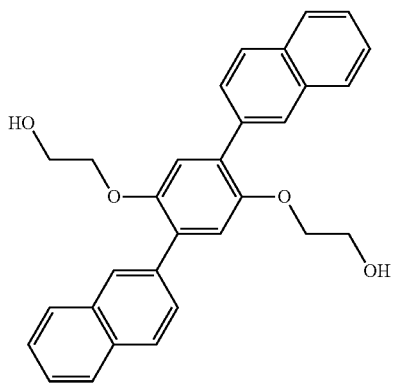
Monomer 3-1
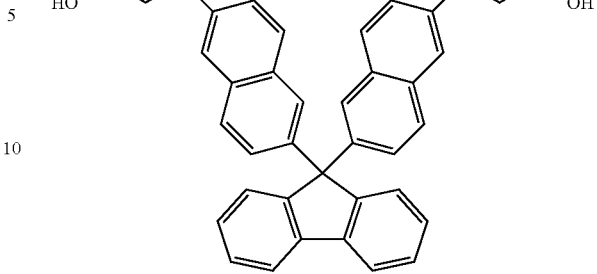
Monomer 3-2
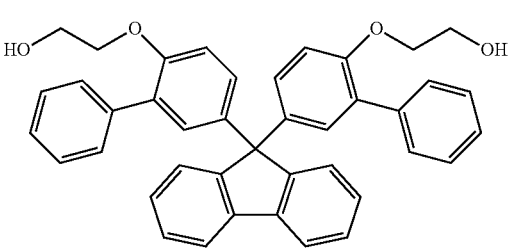
Monomer 2-1
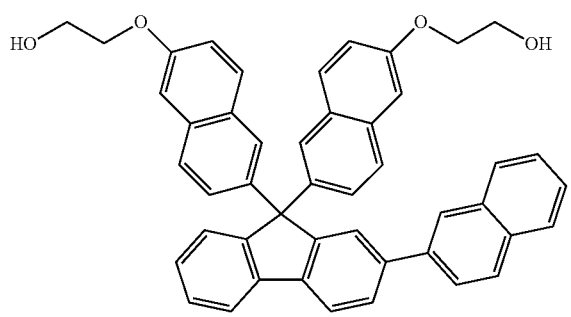
Preparation Examples 2 to 16 Preparation of Resins 2 to 16
Resins 2 to 16 were obtained by preparation in the same manner as in Preparation Example 1, except that the monomers in the following Table 1 were used in amounts of the following parts by weight instead of Monomers 1-1 and 2-1 in Preparation Example 1.
Monomer 3-3
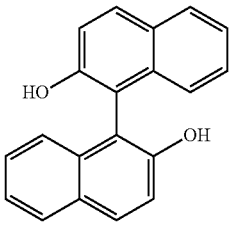
Monomer 3-4
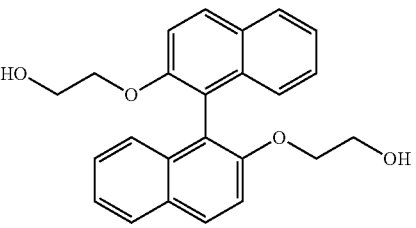
Monomer 1-2
Monomer 3-5
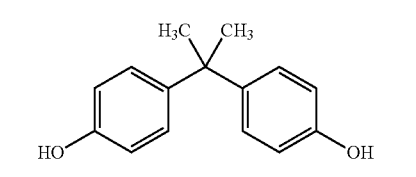
Monomer 3-6
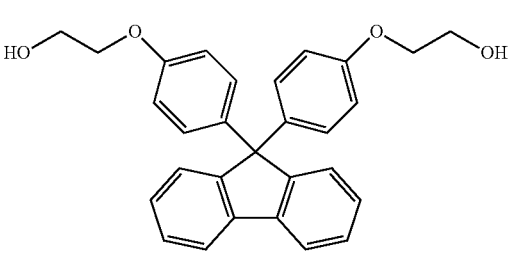

Monomer 3-7

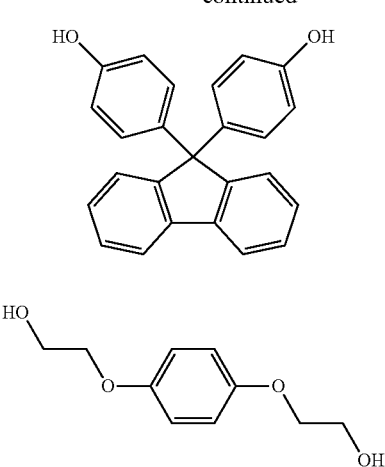

Monomer 3-8

TABLE 1

| No. | Monomer 1-1 | Monomer 2-1 | Monomer 1-2 | Monomer 3-1 | Monomer 3-2 | Monomer 3-3 | Monomer 3-4 | Monomer 3-5 | Monomer 3-6 | Monomer 3-7 | Monomer 3-8 |
|---|---|---|---|---|---|---|---|---|---|---|---|
| Resin 1 | 70 | 30 | | | | | | | | | |
| Resin 2 | 50 | 50 | | | | | | | | | |
| Resin 3 | 10 | 10 | | | | | | | 80 | | |
| Resin 4 | 15 | 5 | | | 80 | | | | | | |
| Resin 5 | 15 | 5 | | 80 | | | | | | | |
| Resin 6 | 10 | 10 | | | | | | | | | 80 |
| Resin 7 | 15 | 5 | | | | | | | | 80 | |
| Resin 8 | 10 | 10 | | | | 80 | | | | | |
| Resin 9 | 5 | 5 | | 67 | 23 | | | | | | |
| Resin 10 | 5 | 5 | | 36 | 54 | | | | | | |
| Resin 11 | 5 | 5 | | 16 | 39 | | 35 | | | | |
| Resin 12 | 5 | 5 | | 54 | | | | 36 | | | |
| Resin 13 | 5 | 5 | | 38 | | | 30 | | 22 | | |
| Resin 14 | 5 | 5 | 5 | 44 | | | 41 | | | | |
| Resin 15 | 1 | 1 | | 28 | 35 | | 35 | | | | |
| Resin 16 | 1 | 1 | | 30 | 30 | | 38 | | | | |

Experimental Example

The molecular weight and molecular weight distribution of the polymerized resin sample were confirmed through gel permeation chromatography (GPC), and a thermogram was obtained using a differential scanning calorimeter (DSC) to investigate the thermal characteristics. After a film was formed to measure the refractive index and the Abbe's Number, a result value according to the wavelength of light was obtained using an ellipsometer.

For the molecular weight through gel permeation chromatography (GPC), results were obtained by injecting a solution produced using tetrahydrofuran (THF, stabilized with butylated hydroxytoluene (BHT)) as a solvent, dissolving the resin sample in tetrahydrofuran at a concentration of 1.0 mg/1 ml, filtering the dissolved resin sample with a syringe filter, and measuring the molecular weight at 40° C., and the results are shown in the following Table 2. A Waters RI detector was used, and two Agilent PLgel MIXED-B columns were used.

A differential scanning calorimeter (DSC) was measured to determine the glass transition temperature (Tg) of the resin. A glass transition temperature (Tg) was obtained on a graph obtained by heating 5.5 mg to 8.5 mg of the resin sample to 270° C. under $N_2$ flow, cooling the resin sample, and then scanning the resin sample while heating the resin sample at a heating rate of 10° C./min during the second heating, and the glass transition temperature (Tg) is shown in the following Table 2.

In order to measure the refractive index and Abbe's Number of the resin, a polymer solution prepared by dissolving a resin powder sample obtained by polymerization in a solvent dimethylacetamide in an amount of 10 wt % based on the total weight of the polymer solution was applied onto a silicon wafer at a rotation speed of 220 rpm by spin coating to form a film having a thickness of 20 μm, and then the resulting values according to the wavelength of light were obtained at 20° C. using an ellipsometer, and are shown in the following Table 2. Specifically, the refractive index was measured at a wavelength of 589 nm, and for the Abbe's Number, an Abbe's Number was obtained by the following Equation by measuring the refractive index ($n_D$, $n_F$, and $n_C$) at a wavelength of D (587 nm), F (486 nm), and C (656 nm), respectively.

Abbe's Number = $(n_D - 1)/(n_F - n_C)$

TABLE 2

| No. | Mn (g/mol) | Mw (g/mol) | PDI | RI (587 nm) | Tg (° C.) | Abbe's Number |
|---|---|---|---|---|---|---|
| Resin 1 | 21000 | 43000 | 2.05 | 1.709 | 138.0 | 14.5 |
| Resin 2 | 15000 | 33000 | 2.20 | 1.707 | 157.6 | 14.0 |
| Resin 3 | 13000 | 24000 | 1.85 | 1.653 | 145.0 | 21.0 |
| Resin 4 | 12000 | 23000 | 1.92 | 1.671 | 152.8 | 19.5 |
| Resin 5 | 11000 | 25000 | 2.27 | 1.679 | 152.7 | 17.8 |
| Resin 6 | 20000 | 38000 | 1.90 | 1.607 | 85.0 | 26.5 |
| Resin 7 | 12000 | 21000 | 1.75 | 1.664 | 168.0 | 19.3 |
| Resin 8 | 10000 | 22000 | 2.20 | 1.700 | 168.0 | 14.2 |
| Resin 9 | 18000 | 33000 | 1.83 | 1.680 | 161.6 | 17.5 |
| Resin 10 | 17000 | 35000 | 2.06 | 1.670 | 155.3 | 19.3 |
| Resin 11 | 15000 | 28000 | 1.87 | 1.669 | 139.6 | 19.5 |
| Resin 12 | 16000 | 31000 | 1.94 | 1.650 | 156.0 | 21.2 |
| Resin 13 | 16000 | 28000 | 1.75 | 1.670 | 144.4 | 19.8 |
| Resin 14 | 15000 | 26000 | 1.73 | 1.680 | 141.6 | 17.2 |
| Resin 15 | 16000 | 28000 | 1.75 | 1.669 | 141.6 | 19.3 |
| Resin 16 | 18000 | 32000 | 1.78 | 1.670 | 140.9 | 19.6 |

In Table 2, Mn means the number average molecular weight, Mw means the weight average molecular weight, PDI means the polydispersity index, RI means the refractive index, Tg means the glass transition temperature, and the refractive index is a value measured at a wavelength of 587 nm.

According to Table 2, the resin according to an exemplary embodiment of the present invention includes the unit of Chemical Formula 1 and the unit of Chemical Formula 2, and in particular, the core structure of Chemical Formula 1 is a phenylene group, so that it could be confirmed that the refractive index of the resin was improved because the molecular volume is small and the ability to be packed is excellent.

In addition, Ar1 and Ar2 have electron-rich substituents, and thus have high electron density, and the benzene ring of the fluorene core structure of Chemical Formula 2 is also substituted with an electron-rich R2 substituent, so that due to the high electron density of the fluorene core structure, the refractive index of the polycarbonate resin including the same is improved.

Furthermore, since the unit of Chemical Formula 3 is further included in the unit of Chemical Formula 1 and the unit of Chemical Formula 2, the glass transition temperature (Tg) and refractive index can be adjusted, and the chain behavior of the polycarbonate resin can be made flexible, so that there is a technical effect advantageous for the injection processing of a molded article.

The invention claimed is:
1. A polycarbonate resin, comprising:
a unit of the following Chemical Formula 1; and
a unit of the following Chemical Formula 2:

[Chemical Formula 1]

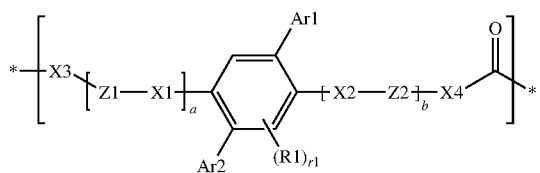

[Chemical Formula 2]

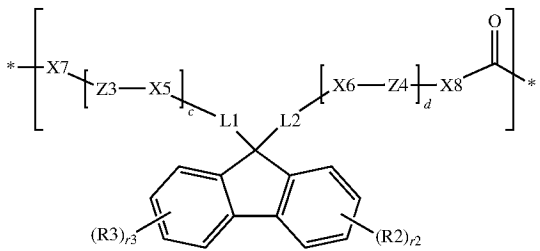

wherein, in Chemical Formulae 1 and 2,

Ar1 and Ar2 are the same as or different from each other, and are each independently a substituted or unsubstituted aryl group, or a substituted or unsubstituted heteroaryl group, R1 is hydrogen, deuterium, a halogen group, a cyano group, a substituted or unsubstituted alkyl group, a substituted or unsubstituted cycloalkyl group, a substituted or unsubstituted alkoxy group, a substituted or unsubstituted silyl group, a substituted or unsubstituted aryl group, or a substituted or unsubstituted heteroaryl group, R2 and R3 are different from each other, and are each independently hydrogen, deuterium, a halogen group, a cyano group, a substituted or unsubstituted alkyl group, a substituted or unsubstituted cycloalkyl group, a substituted or unsubstituted alkoxy group, a substituted or unsubstituted silyl group, an aryl group which is unsubstituted or substituted with deuterium, a halogen group, a hydroxyl group, a cyano group, an alkyl group, a cycloalkyl group, an alkoxy group, an alkenyl group, an aryloxy group, an arylthio group, an alkylthio group, an aryl group, or a heteroaryl group, or a substituted or unsubstituted heteroaryl group, r1 is 1 or 2, and when r1 is 2, each R1 is the same as or different from each other, r2 and r3 are each an integer from 1 to 4, and when r2 is 2 to 4, two or more R2 are the same as or different from each other, and when r3 is 2 to 4, two or more R3 are the same as or different from each other, L1 and L2 are the same as or different from each other, and are each independently a substituted or unsubstituted arylene group, X1 to X8 are the same as or different from each other, and are each independently O or S, Z1 to Z4 are the same as or different from each other, and are each independently a substituted or unsubstituted alkylene group, or a substituted or unsubstituted cycloalkylene group, and a, b, c and d are the same as or different from each other, and are each independently an integer from 1 to 10, and when a and b are each 2 to 10, each of Z1-X1 and X2-Z2 are the same as or different from each other.

2. The polycarbonate resin of claim 1, further comprising: a unit of the following Chemical Formula 3:

[Chemical Formula 3]

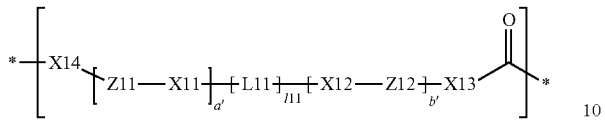

wherein, in Chemical Formula 3,
L11 is a substituted or unsubstituted alkylene group, a substituted or unsubstituted cycloalkylene group, a condensed ring group of a divalent aromatic hydrocarbon ring and an aliphatic hydrocarbon ring which is substituted or unsubstituted, or a substituted or unsubstituted arylene group,
l11 is an integer from 1 to 5, and when l11 is 2 to 5, two or more L11 are the same as or different from each other,
X11 to X14 are the same as or different from each other, and are each independently O or S,
Z11 and Z12 are the same as or different from each other, and are each independently a substituted or unsubstituted alkylene group, or a substituted or unsubstituted cycloalkylene group, and
a' and b' are the same as or different from each other, and are each independently an integer from 0 to 10, and when a' and b' are each 2 to 10, each of Z11-X11 and X12-Z12 are the same as or different from each other.

3. The polycarbonate resin of claim 1, wherein Ar1 and Ar2 are the same as or different from each other, and are each independently a monocyclic or polycyclic aryl group having 6 to 30 carbon atoms which is unsubstituted or substituted with a monocyclic or polycyclic aryl group having 6 to 30 carbon atoms or a monocyclic or polycyclic heteroaryl group having 2 to 30 carbon atoms, or a monocyclic or polycyclic heteroaryl group having 2 to 30 carbon atoms which is unsubstituted or substituted with a monocyclic or polycyclic aryl group having 6 to 30 carbon atoms,
R1 is hydrogen,
X1 to X4 are O, and
Z1 and Z2 are the same as or different from each other, and are each independently a straight-chained or branched alkylene group having 1 to 30 carbon atoms.

4. The polycarbonate resin of claim 1, wherein R2 and R3 are different from each other, and are each independently hydrogen, or an unsubstituted monocyclic or polycyclic aryl group having 6 to 30 carbon atoms,
L1 and L2 are the same as or different from each other, and are each independently a monocyclic or polycyclic arylene group having 6 to 30 carbon atoms,
X5 to X8 are O, and
Z3 and Z4 are the same as or different from each other, and are each independently a straight-chained or branched alkylene group having 1 to 30 carbon atoms.

5. The polycarbonate resin of claim 1, wherein the polycarbonate resin has a weight average molecular weight (Mw) of 5,000 g/mol to 500,000 g/mol.

6. The polycarbonate resin of claim 1, wherein the polycarbonate resin has a refractive index of 1.50 to 1.75, wherein the refractive index is measured at a wavelength of 587 nm.

7. The polycarbonate resin of claim 1, wherein the polycarbonate resin has a glass transition temperature (Tg) of 80° C. to 200° C.

8. The polycarbonate resin of claim 1, wherein the polycarbonate resin has an Abbe's Number of 5 to 45, wherein the Abbe's Number is measured at a wavelength of 486, 587, and 656 nm.

9. A method for preparing the polycarbonate resin according to claim 1, the method comprising:
polymerizing a composition comprising a compound of the following Chemical Formula 1a, a compound of the following Chemical Formula 2a, and
a polycarbonate precursor:

[Chemical Formula 1a]

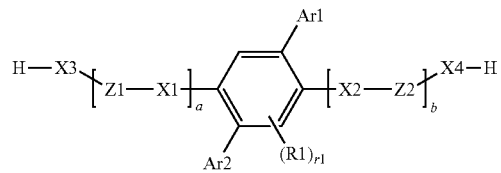

[Chemical Formula 2a]

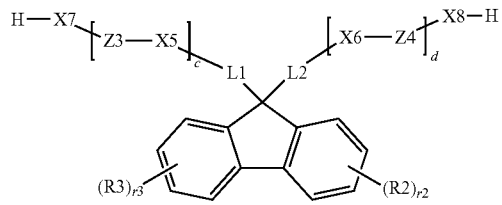

wherein, in Chemical Formulae 1a and 2a,
Ar1 and Ar2 are the same as or different from each other, and are each independently a substituted or unsubstituted aryl group, or a substituted or unsubstituted heteroaryl group,
R1 is hydrogen, deuterium, a halogen group, a cyano group, a substituted or unsubstituted alkyl group, a substituted or unsubstituted cycloalkyl group, a substituted or unsubstituted alkoxy group, a substituted or unsubstituted silyl group, a substituted or unsubstituted aryl group, or a substituted or unsubstituted heteroaryl group,
R2 and R3 are different from each other, and are each independently hydrogen, deuterium, a halogen group, a cyano group, a substituted or unsubstituted alkyl group, a substituted or unsubstituted cycloalkyl group, a substituted or unsubstituted alkoxy group, a substituted or unsubstituted silyl group, an aryl group which is unsubstituted or substituted with deuterium, a halogen group, a hydroxyl group, a cyano group, an alkyl group, a cycloalkyl group, an alkoxy group, an alkenyl group, an aryloxy group, an arylthio group, an alkylthio group, an aryl group, or a heteroaryl group, or a substituted or unsubstituted heteroaryl group,
r1 is 1 or 2, and when r1 is 2, each R1 is the same as or different from each other,
r2 and r3 are each an integer from 1 to 4, and when r2 is 2 to 4, two or more R2 are the same as or different from each other, and when r3 is 2 to 4, two or more R3 are the same as or different from each other,
L1 and L2 are the same as or different from each other, and are each independently a substituted or unsubstituted arylene group, X1 to X8 are the same as or different from each other, and are each independently O or S, Z1 to Z4 are the same as or different from each other, and are each independently a substituted or unsubstituted alkylene group, or a substituted or unsubstituted cycloalkylene group, and a, b, c and d are the same as or different from each other, and are each independently an integer from 1 to 10, and when a and b are each 2 to 10, each of Z1-X1 and X2-Z2 are the same as or different from each other.

10. The method of claim 9, wherein the composition further comprises a compound of the following Chemical Formula 3a, and the compound of Chemical Formula 1a, Chemical Formula 2a, and Chemical Formula 3a are present in amounts of 0.01 mole % to 99.99 mole %: 0.01 mole % to 99.99 mole %: 0 mole % to 99.98 mole %:

[Chemical Formula 3a]

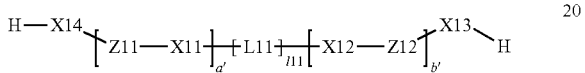

in Chemical Formula 3a,

L11 is a substituted or unsubstituted alkylene group; a substituted or unsubstituted cycloalkylene group, a condensed ring group of a divalent aromatic hydrocarbon ring and an aliphatic hydrocarbon ring which is substituted or unsubstituted, or a substituted or unsubstituted arylene group, l11 is an integer from 1 to 5, and when l11 is 2 to 5, two or more L11 are the same as or different from each other, X11 to X14 are the same as or different from each other, and are each independently O or S, Z11 and Z12 are the same as or different from each other, and are each independently a substituted or unsubstituted alkylene group, or a substituted or unsubstituted cycloalkylene group, and a' and b' are the same as or different from each other, and are each independently an integer from 0 to 10, and when a' and b' are each 2 to 10, each of Z11-X11 and X12-Z12 are the same as or different from each other.

11. The method of claim 9, wherein the polycarbonate precursor is the following Chemical Formula A:

[Chemical Formula A]

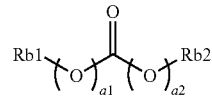

in Chemical Formula A,

Rb1 and Rb2 are the same as or different from each other, and are each independently a halogen group, a substituted or unsubstituted alkyl group, or a substituted or unsubstituted aryl group, and a1 and a2 are each 0 or 1.

12. A polycarbonate resin composition comprising the polycarbonate resin according to claim 1.

13. A molded article comprising the polycarbonate resin composition according to claim 12.

* * * * *